INVENTOR.
JOSEPH L. GERTZ
BY Marvin Moody
ATTORNEY

United States Patent Office 2,920,595
Patented Jan. 12, 1960

2,920,595
END WIRE HOLDER

Joseph L. Gertz, La Crescenta, Calif., assignor to Collins Radio Company, Cedar Rapids, Iowa, a corporation of Iowa Application November 4, 1957, Serial No. 694,322

2 Claims. (Cl. 113—99)

This invention pertains to jigs for holding fine wire that is to be accurately placed and soldered to relatively large work pieces and particularly to jigs suitable for positioning wires that are to be soldered to elements of electromechanical filters. In certain devices, a length of wire must be accurately positioned during the soldering operation by means that will not bend the wire, even though the wire is quite small in diameter. Special care is required for soldering wires to work pieces that are not readily accessible. For example, the points to which end wires are to be soldered in the assembly of electromechanical filters that are described in U.S. Patent No. 2,693,580, entitled "Electromechanical Filter With Center Drive of Disc," issued November 2, 1954, to Wesley D. Peterson, is obviously not readily accessible after the filter is partially or completely assembled. According to the description contained within this reference, the end wires have been attached to the resonating elements by either a staking or a welding process. Through the use of the jig or end-wire holder of the invention described herein, the end wires may be attached more economically by a soldering process. An assemblying jig that uses the end-wire holder of this invention is described in United States Patent No. 2,869,498, "Soldering Jig for Mechanical Filters," issued to William E. Whittington on January 20, 1959, and assigned to the assignee of this invention.

An object of this invention is to provide a holder for accurately positioning wire on a work piece and for constantly urging said wire against said work piece. A feature of this invention is the utilization of permanent magnets in the holder for urging outwardly wire that has been inserted in the holder.

The description and appended claims of this invention may be more readily understood with reference to the accompanying drawings in which:

Figure 1:
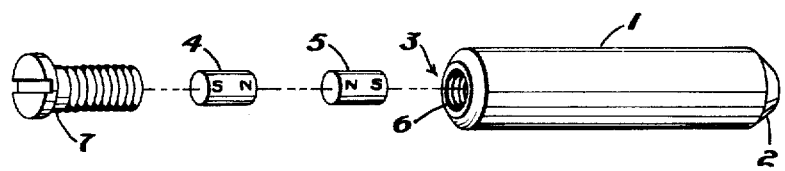
Figure 1 is an exploded view of the end-wire holder of this invention.

The end-wire holder shown in Figure 1 comprises a non-magnetic holder having a bore for receiving wire that is to be soldered to a particular work piece. In the embodiment shown, the holder is cylindrical and has the proper diameter for fitting snugly into an end-supporting cylinder of an electromechanical filter. After an end wire has been inserted into the holder, the holder is inserted into the end-supporting cylinder to position the wire with respect to the resonating elements of the electromechanical filter. A pair of permanent magnets are disposed in a cavity in that end of the cylindrical holder that is opposite the end into which the wire is to be inserted. These magnets are positioned in the cavity such that they exert a repelling force on each other and thereby exert a constantly outward force on a wire that has been inserted in the holder.

Specifically, the holder of Figure 1 comprises a non-magnetic cylindrical holder 1 that contains an axial bore for receiving a fine wire that is to be soldered. The end of the cylinder that is to face the work piece has a bevel surface 2 to aid in guiding the holder to a desired position relative to the work piece. A cavity 3 is disposed in the end of the holder that is opposite that for receiving the wire and has slightly larger diameter than that of permanent magnets 4 and 5 that are inserted in the holder with a pair of like poles together. The outer end of the cavity for the magnets has an inside threaded portion 6 for receiving retaining screw 7.

Figure 2:
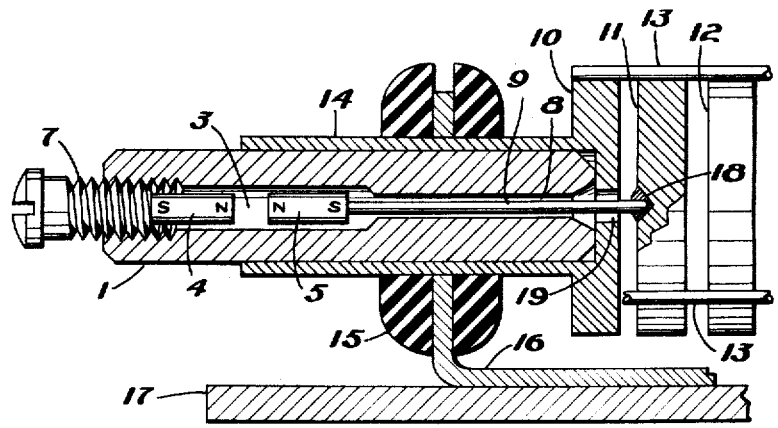
Figure 2 is a longitudinal sectional view showing the application of the end-wire holder of Figure 1 to the end portion of an electromechanical filter.

The sectional view of Figure 2 shows application of the end-wire holder to an electromechanical filter assembly. Only one end of the filter is shown; the other end is identical. The end wire 9 of the filter is retained within bore 8 of the holder. The filter is the type that comprises spaced parallel end-supporting disc 10, first active disc 11, and a plurality of discs 12 all joined together by coupling wires 13. A supporting end cylinder 14 that is coaxial with the disc is secured to the outer face of end disc 10. Each end of the mechanical filter is supported by a resilient grommet 15 which fits snugly about supporting cylinder 14 and which is supported by brackets 16 and base 17.

With reference to Figure 2, before the holder is inserted into supporting cylinder 14, end wire 9 is inserted into bore 8 and contacts magnet 5. Since the end wire in this particular application is magnetic, magnet 5 prevents the wire from falling out. The first active disc 11 has a center dimple which is filled with solder 18. The holder 1 is inserted into cylinder 14 so that the outer end of end wire 9 passes through opening 19 of disc 10 and contacts solder 18 that has been placed in the dimple of disc 11. The holder 1 is retained in the cylinder 14 by suitable retaining means, not shown, so that after wire 9 contacts solder 18, magnet 5 is forced close to magnet 4 by the length of wire. The repelling force between magnet 4 and magnet 5 constantly urges end wire 9 outwardly against solder 18. The active disc 11 is then heated until solder 18 is melted so that end wire 9 is pressed through the molten solder into the dimple. After the solder has cooled, the holder 1 is removed from the end-supporting cylinder 14.

Although this invention has been described with respect to a particular embodiment thereof, it is not to be so limited as changes and modifications may be made therein which are within the full intended scope of the invention as defined by the appended claims.

What is claimed is:

1. A holding jig for accurately positioning wire that is to be soldered to work pieces comprising, a non-magnetic holder, said holder having a bore for slidably receiving a length of said wire, a pair of elongated permanent magnets, said holder having a chamber for receiving said magnets, said chamber communicating with said bore so that the inner end of a length of said wire that is inserted in said bore is guided to bear against one end of one of said magnets, said one magnet being slidably mounted within said chamber, the walls of said chamber maintaining the north-south axes of said magnets in approximate alignment, and said magnets having like poles together so that said one magnet gently urges outwardly the inserted length of said wire to press the outer end of said inserted wire against one of said work pieces.

2. An end wire holder for assembling end wires to vibrational elements of electromechanical filters of the type that have end-supporting cylinders attached to end discs comprising, a non-magnetic cylindrical holder to be slidably inserted into said supporting cylinders, a pair of cylindrical permanent magnets, said holder having an axial bore for slidably receiving a length of said wire and having a cylindrical chamber communicating with said bore for slidably receiving said magnets, one of said magnets bearing on the inner end of an inserted length of said wire, said magnets being confined within said chamber with a pair of like poles together for gently urging said inserted wire outwardly for pressing the outer end of said inserted wire against one of said vibrational elements.

References Cited in the file of this patent

UNITED STATES PATENTS

| | | |
|---|---|---|
| 1,627,288 | Kurkowski | May 3, 1927 |
| 2,584,297 | Schmuldt | Feb. 5, 1952 |
| 2,713,379 | Sisson | July 19, 1955 |
| 2,803,879 | Cook | Aug. 27, 1957 |
| 2,869,498 | Whittington | Jan. 20, 1959 |